United States Patent [19]

Olstowski

[11] 3,989,663

[45] *Nov. 2, 1976

[54] SOLID, RAPID-SETTING RIGID POLYURETHANES

[75] Inventor: Franciszek Olstowski, Freeport, Tex.

[73] Assignee: The Dow Chemical Company, Midland, Mich.

[ * ] Notice: The portion of the term of this patent subsequent to June 29, 1993, has been disclaimed.

[22] Filed: May 5, 1975

[21] Appl. No.: 574,210

Related U.S. Application Data

[60] Division of Ser. No. 405,244, Oct. 10, 1973, which is a continuation-in-part of Ser. No. 327,630, Jan. 29, 1973, abandoned, which is a continuation-in-part of Ser. No. 221,784, Jan. 28, 1972, abandoned.

[52] U.S. Cl. ........................................... 260/33.2 R
[51] Int. Cl.$^2$ ......................................... C08K 5/06
[58] Field of Search ................ 260/33.8 UB, 33.2 R, 260/30.4 N, 30.2, 31.4, 33.2

[56] References Cited

UNITED STATES PATENTS

| | | | |
|---|---|---|---|
| 3,102,875 | 9/1963 | Heiss | 260/30.4 N |
| 3,489,723 | 1/1970 | Kraft | 260/37 N |
| 3,725,355 | 4/1973 | Parrish | 260/37 N |
| 3,746,692 | 7/1973 | Olstowski | 260/77.5 MA |
| 3,878,157 | 4/1975 | Olstowski | 260/18 TN |

Primary Examiner—Paul R. Michl
Attorney, Agent, or Firm—James G. Carter

[57] ABSTRACT

Compositions which will rapidly set to produce solid, rigid polyurethanes without the use of a catalyst comprise an amine initiated polyether polyol such as triethanol amine, an organic aromatic polyisocyanate, such as toluene diisocyanate and a liquid modifier compound having a boiling point above about 150° C such as trichlorobenzene.

12 Claims, No Drawings

SOLID, RAPID-SETTING RIGID POLYURETHANES

This application is a division of application Ser. No. 405,244, filed Oct. 10, 1973 which is a continuation-in-part of application Ser. No. 327,630, filed Jan. 29, 1973 now abandoned, which is a continuation-in-part of Ser. No. 221,784, filed Jan. 28, 1972 now abandoned.

This invention relates to rapid-setting, rigid, polyurethane compositions comprising an amine initiated polyol, an organic aromatic polyisocyanate and a liquid modifier compound boiling above about 150° C.

Rapid-setting, rigid polyurethanes are known and taught in U.S. Pat. No. 3,378,511 and in copending applications having serial numbers and filing dates of 179,149 filed Sept. 9, 1971; 195,498, filed Nov. 3, 1971 now U.S. Pat. No. 3,726,827 and 191,343 filed Oct. 21, 1971 now U.S. Pat. No. 3,746,692.

Each of these disclose rapid-setting polyurethane compositions, but in each instance, a catalyst for urethane formation is required.

It has now been discovered that rapid-setting, solid, rigid polyurethane compositions can be prepared without the use of a catalyst or externally applied heat.

By the term "rigid" or non-elastomeric as used herein, it is meant that the compositions which when solidified or set have percent elongation values at the break point of less than 100 percent.

By the term "solid" as used herein, it is meant that the compositions when solidified or set have densities of at least 1 gram per cubic centimeter.

The term "rapid-setting" as used herein means that the composition will rapidly solidify without the application of external sources of heat and can be removed from a mold within 5 minutes and preferably within 3 minutes from the time the reactants are mixed together. Upon removal from the mold, the products have sufficient strength to be handled and normally have sufficient strength to be employed for their intended purpose; however, the physical properties, if desired, usually can be improved by post curing at elevated temperatures.

The rapid-setting, solid, rigid polyurethane compositions of the present invention comprise A. an amine initiated polyol having an equivalent weight of from about 50 to less than about 250 and preferably from about 50 to about 200;
B. an organic aromatic polyisocyanate;
C. as a modifier compound, a liquid modifier compound having a boiling point above about 150° C selected from the group consisting of hydroxyl-containing and non-hydroxyl-containing polyoxyalkylene compounds, ester-modified polyoxyalkylene compounds, organic phosphates, organic phosphites, organic phosphonates, cyclic ethers, aromatic compounds, partially hydrogenated aromatic compounds, organic carbonates, chlorinated aliphatic compounds, cyclic sulfones, esters of carboxylic acids and mixtures thereof;

wherein components (A) and (B) are present in quantities so as to provide an NCO:OH ratio of from about 0.8:1 to about 1.5:1 and preferably from about 0.9:1 to about 1.2:1 and most preferably from about 0.95:1 to about 1.05:1, and component (C) is employed in quantities of from about 5% to about 60%, and preferably from about 15% to about 40% by weight based upon the combined weight of components (A), (B) and (C).

Suitable amine initiated polyols which are employed as component (A) in the present invention include, for example, those prepared by reacting an alkylene oxide with an amine having from 3 to about 8 active hydrogen atoms.

Suitable amines include, for example, ammonia, ethylenediamine, 1,3-diaminopropane, 1,4-diaminobutane, 1,5-diaminopropane, 1,6-diaminohexane, diethylenetriamine, triethylenetetramine, tetraethylenepentamine, pentaethylenehexamine, mixtures thereof and the like.

Suitable alkylene oxides include, for example, ethylene oxide, 1,2-propylene oxide, 1,2-butylene oxide, 2,3-butyleneoxide, styrene oxide, epichlorohydrin, epibromohydrin, epiiodohydrin, mixtures thereof and the like.

Suitable organic aromatic polyisocyanates which are employed as component (B) in the present invention include, for example, any organic polyisocyanate having 2 or more NCO groups per molecule and no other substituents capable of reacting with the hydroxyl groups of the amine initiated polyoxyalkylene compounds employed as component (A) or the hydroxyl containing compounds employed as component (C). Suitable such polyisocyanates include, for example, 2,4-toluenediisocyanate, 2,6-toluenediisocyanate, xylylenediisocyanate, p,p'-diphenylmethanediisocyanate, p-phenylenediisocyanate, naphthalene diisocyanate, dianisidine diisocyanate, polymethylene polyphenylisocyanate, mixtures of one or more polyisocyanates and the like.

Other organic isocyanates which are suitably employed and which are to be included in the term organic aromatic polyisocyanate include isocyanate terminated prepolymers prepared from the previously mentioned polyols, amine initiated or hydroxyl initiated polyols, and aromatic polyisocyanates.

What is meant by the term "organic aromatic polyisocyanate" is that the polyisocyanate contains at least one aromatic ring.

Suitable polyoxyalkylene compounds which are employed as the liquid modifier compound (Component C) include, for example, 1. a liquid, totally-capped or non-hydroxyl-containing block or randomly formed polyoxyalkylene glycol represented by the general formula

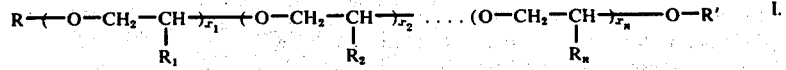

wherein R and R' are independently selected from saturated and unsaturated hydrocarbon groups having from about 1 to about 6, preferably from about 1 to about 3, carbon atoms; $R_1, R_2, \ldots$ and $R_n$ are independently hydrogen, an aryl group, an alkyl group or haloalkyl group, said alkyl or haloalkyl group having from about 1 to about 2 carbon atoms with the proviso that when $R_1, R_2 \ldots R_n$ is a haloalkyl group, it is present in minor amounts i.e. a ratio of from about 0 to about 10 percent of the total $R_1, R_2 \ldots R_n$ groups, and $x_1, x_2, \ldots$ $x_n$ are integers, such that the boiling point of the liquid capped polyoxyalkylene glycol is above about 150° C;

2. a liquid partially capped, block or randomly formed polyoxyalkylene compound represented by the general formula

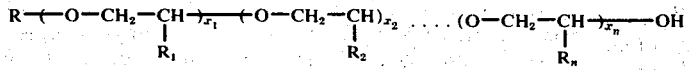  II.

wherein R and $R_1$, $R_2$ ... $R_n$ are as defined in formula I above and $x_1$, $x_2$, ... $x_n$ are integers, the sum of which provides the partially capped polyoxyalkylene compound with a molecular weight of at least about 700;

3. a liquid, block or randomly formed polyoxyalkylene glycol represented by the general formula

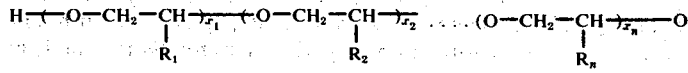  III.

wherein $R_1$, $R_2$ ... $R_n$ are as defined in formula I above and $x_1$, $X_2$ ... $x_n$ are integers, the sum of which provides the polyoxyalkylene glycol with an equivalent weight of at least about 700, and 4. a liquid, random or block polyoxyalkylene polyol having a hydroxyl functionality of from 3 to about 8 represented by the general formula

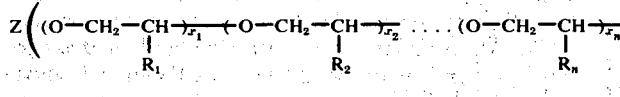  IV.

wherein $R_1$, $R_2$ ... $R_n$ are as defined in formula I above, Z is the residue of an initiator compound having from 3 to about 8 hydroxyl groups, $x_1$, $x_2$, ... $x_n$ are integers, the sum of which provides the polyoxyalkylene polyol with a hydroxyl equivalent weight of at least about 500 and $q$ is an integer having a value of from 3 to about 8.

Suitable ester-modified polyoxyalkylene compounds which are employed as the liquid modifier compound (Component C) include, for example, those liquid ester-modified polyethers having a boiling point above about 150° C represented by the general formula

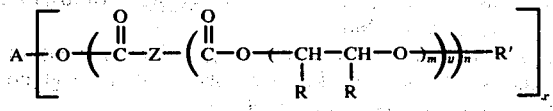  V.

wherein A is the residue of an initiator or starting compound having from 1 to about 8 hydroxyl groups, Z is the residue, excluding the carboxyl groups, of an internal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from 1 to 20 carbon atoms, a halomethyl radical, a phenyl radical, and a phenoxymethyl radical, an alkoxymethyl radical with the proviso that one of the R substituents must be hydrogen, R' is hydrogen or a saturated or unsaturated aliphatic group having from 1 to 20 carbon atoms, m has an average value of from about 1.0 to about 2.0, n has a value from about 1 to about 5, $x$ has a value from about 1 to about 8 and $y$ has a value of 1 or 2 and wherein said ester-modified polyether compound has a hydroxyl equivalent weight above about 500 when 3 or more hydroxyl groups are present and when 2 hydroxyl groups are present, an average equivalent weight of above about 700 and when zero or one hydroxyl group is present a molecular weight of above about 700.

Suitable initiators which are employed to prepare the liquid polyoxyalkylene and ester-modified polyoxyalkylene modifier compounds (Component C) of the present invention include compounds having from 1 to about 8 hydroxyl groups such as, for example, methanol, ethanol, propanol, butanol, ethylene glycol, propylene glycol, butylene glycol, 1,6-hexane diol, glycerine, trimethylolpropane, pentaerythritol, sorbitol, sucrose, mixtures thereof and the like.

When the liquid modifier compound, component (C), is an ester modified polyether polyol, the initiator compound may also be and is preferably an adduct of the above mentioned initiator compounds and one or more of the following vicinal epoxide-containing compounds, i.e. the initiator compound is a polyoxyalkylene compound having 1 to 8 hydroxyl groups, preferably 2 to about 3 or 4 hydroxyl groups.

Suitable vicinal epoxide compounds which may be reacted with the above mentioned initiator compounds to prepare the modifier compounds (Component C) employed in the present invention include, for example, ethylene oxide, 1,2-propylene oxide, 1,2-butylene oxide, 2,3-butylene oxide, epichlorohydrin, epibromohydrin, epiiodohydrin, styrene oxide, mixtures thereof and the like.

The liquid modifier compounds represented by formulae I–IV and methods for their preparation are well known in the art, e.g. U.S. Pat. Nos. 2,448,664, 2,425,755, 2,782,240 and 2,520,611. Methods for the preparation of the liquid modifier compounds represented by the formula V are given in a copending application Ser. No. 67,233, filed Aug. 26, 1970 by Robert W. McAda, Jr. for "ESTER-MODIFIED POLYETHER POLYOLS" and in U.S. Pat. No. 3,502,601.

Suitable aromatic compounds which are employed as the liquid modifier compound having a boiling point above about 150° C (Component C) in the present invention include, for example, straight and branch chain aliphatic, alkoxy and halogen substituted benzenes, aromatic substituted benzene and aromatic ethers, such as, for example, propenyl benzene, propylbenzene, butylbenzene, ethyltoluene, butyltoluene, propyltoluene, diphenyl oxide, biphenyl, o-, m- and p-diethyl-benzene, dodecylbenzene, octadecylbenzene, bromobenzene, 1-bromo-3-chlorobenzene, 1-bromo-4-fluorobenzene, 1-bromo-2-iodobenzene, 1-bromo-3-iodobenzene, 1-chloro-4-fluorobenzene, o-dibromobenzene, m-dibromobenzene, o-dichlorobenzene, m-dichlorobenzene, 1,3-dipropoxybenzene, 1-ethyl-4-propylbenzene, 1-fluoro-4-iodobenzene, 4-bromo-o-xylene, α-bromo-m-xylene, 4-bromo-m-xylene, α-chloro-m-xylene, 4-ethyl-m-xylene, 5-ethyl-m-xylene, 2-bromo-p-xylene, α-chloro-p-xylene, 2-ethyl-p-xylene, 2-ethyl-p-xylene, o-bromotoluene, m-bromotoluene, o-, m-, and p-chlorotoluene, tertiary butylstyrene, α-bromostyrene, β-bromostyrene, α-chlorostyrene, β-chlorostyrene, mixtures thereof and the like.

The above compounds are represented by the following general formula provided it is understood that such compounds represented by the formula are liquids and have boiling points at atmospheric pressure above about 150° C.

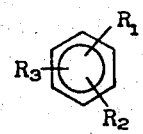

wherein $R_1$, $R_2$ and $R_3$ are independently selected from an alkyl group having from about 1 to about 18 carbon atoms, an alkenyl group having from 2 to about 3 carbon atoms, a halogen, an alkoxy group, an aromatic group and hydrogen.

Other suitable aromatic compounds which are employed as the liquid modifier compound (Component C) in the present invention include liquid multi-ring compounds having a boiling point above about 150° C such as, for example, 1-chloronaphthalene, 1-bromonaphthalene, mixtures thereof and the like.

Suitable partially hydrogenated multi-ring aromatic compounds which are employed as the liquid modifier compound (Component C) in the present invention include, for example, 1,4-dihydronaphthalene, 1,2,3,4-tetrahydronaphthalene, mixtures thereof and the like.

Suitable organophosphorus compounds which are employed as the liquid modifier compound, Component C, include, for example, organo phosphates, organo phosphites and organo phosphonates having boiling points above about 150° C.

Organo phosphates, phosphites and phosphonates which are employed as the liquid modifier compound include those liquid compounds represented by the formulae

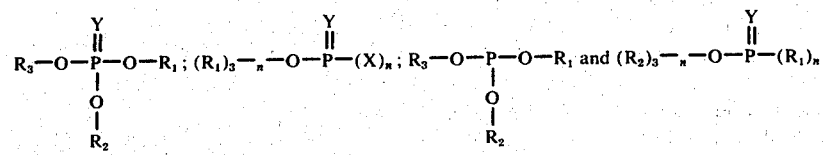

wherein $R_1$, $R_2$ and $R_3$ are independently selected from the group consisting of alkyl, alkoxyaryl, aryloxyaryl, alkaryl, aralkyl groups and halogen substituted derivatives thereof. Y is oxygen or sulfur, X is a halogen, i.e. chlorine, fluorine, bromine or iodine, n has a value of 1 or 2. Suitable such compounds include, for example, tri-n-butyl phosphate, triethylphosphate, tricresylphosphate, tris-(beta-chloroethyl)phosphate, tris-(2,3-dibromopropyl)phosphate, butyl dichlorophosphate, 2-chloroethyl dichlorophosphate, ethyl dichlorophosphate, diethyl fluorophosphate, bis(2-chloroethyl) fluorophosphate, dibutyl chlorophosphate, isoamyl dichlorothionophosphate, ethyl dibromothiophosphate, 2-chlorophenyl dichlorophosphate, 2-methoxyphenyl dichlorophosphate, 2-phenoxyphenyl dichlorophosphate, 2-chloroethyl dichlorophosphite, tris(2-chloroethyl)phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate, bis(2-bromopropyl)-2-bromopropane phosphonate.

The organo phosphorus compounds can be prepared by procedures described in ORGANO-PHOSPHORUS COMPOUNDS, G. M. Kosolapoff, John Wiley & Sons, Inc., 1950.

Suitable liquid organic carbonates which are employed as the liquid modifier, component C, in the present invention include the acyclic and cyclic carbonates represented by the formulae

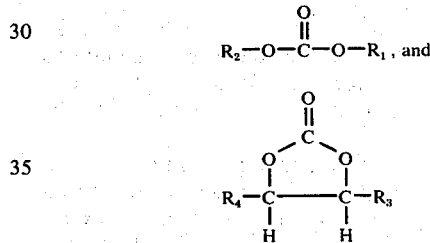

wherein each $R_1$ and $R_2$ are independently aryl, alkyl (having from about 1 to about 6 carbon atoms) or alkenyl groups (having from about 1 to about 6 carbon atoms) and substituted derivatives thereof and each $R_3$ and $R_4$ are selected from the same groups as $R_1$ and $R_2$ and hydrogen.

Suitable liquid acyclic organic carbonates which are employed in the present invention include, for example, bis(2-chloroethyl carbonate), di-n-butyl carbonate, butyldiglycol carbonate, cresyldiglycol carbonate, dibutyl carbonate, di-2-ethylhexyl carbonate, dimethallyl carbonate, dinonyl carbonate and the like. The organic acyclic carbonate may be prepared by procedures given in U.S. Pat. No. 2,687,425.

Suitable liquid cyclic organic carbonates include, for example, propylene carbonate, butylene carbonate, styrene carbonate, mixtures thereof and the like. The cyclic organic carbonates may be prepared in the manner described in Canadian Pat. No. 556,006.

Suitable cyclic polyethers which are employed as the liquid modifier (component C) include, for example, the cyclic tetramer of ethylene oxide, cyclic pentamer of propylene oxide, cyclic tetramer of propylene oxide, mixtures of the above and mixtures of cyclic pentamers and above of ethylene oxide and or propylene oxide. Any liquid cyclic polyether having a boiling point above 150° C may be employed as the liquid modifier in the present invention including cyclic polyethers prepared from butylene oxide, epichlorohydrin and the like.

The liquid cyclic polyether modifier compounds can be prepared by procedures mentioned in "Cyclic Polyethers and Their Complexes with Metal Salts" by C. J. Pedersen, *J. Am. Chem. Soc.*, Vol. 89, p. 7017–7036, 1968, "Twelve-Membered Polyether Rings. The Cyclic Tetramers of Some Olefin Oxides" by R. S. Kern; *J. Org. Chem.*, Vol. 33, p. 388–390, 1968; British Pat. Nos. 785,229 and 1,108,921.

Suitable chlorinated aliphatic compounds having a boiling point above about 150° C which are employed as the modifier compound in the present invention include, for example, such chlorinated aliphatic compounds as hexachlorobutadiene, tetrachlorobutadiene, 1,2,3,3-tetrachlorobutane, 1,2,3-trichloropropene, polyepichlorohydrin diol having an equivalent weight above about 700 up to about 4000, chlorinated paraffins, e.g. "Chlorowax" No. 40, 1-mercapto-3-chloropropanol-2, 3-chloropropane-1,2-diol, 2-chloropropane, 1,3-diol, 1,3-dichloro-2-propanol, mixtures thereof and the like.

Suitable cyclic sulfones which are employed as the liquid modifier compound include the 5-membered cyclic sulfones such as, for example, 3-methylsulfolane (3-methyltetrahydrothiophene-1,1-dioxide) and the like.

Suitable esters of a carboxylic acid which are employed as component (C) in the present invention include those esters prepared from mono- and polycarboxylic acids having from about 1 to about 20 carbon atoms such as for example, phthalic, adipic, acetoacetic, formic, acetic, abietic, acids, and the like and wherein the ester portion contains from about 1 to about 20 carbon atoms such as methyl, ethyl, propyl, butyl, hexyl, cyclohexyl, octyl, decyl, dodecyl, eicosyl and the like so long as the carboxylic acid ester has a boiling point above about 150° C and is a liquid at room temperature.

These acid esters can be prepared by condensing an acid having from about 1 to about 20 carbon atoms with a saturated or unsaturated aliphatic alcohol having from about 1 to about 20 carbon atoms, with the proviso that the ester product is a liquid and has a b.p. >150° C.

The term "liquid modifier boiling above about 150° C" includes eutectic mixtures of the previously described classes of compounds which are solids at atmospheric pressure but said eutectic mixtures are a liquid at room temperature and atmospheric pressure which have boiling points above about 150° C. Also included in the definition are those solid compounds of the classes previously described which are dissolved in a liquid member of any of the described classes of compounds having boiling points above about 150° C wherein the resultant solution is a liquid at standard conditions of temperature and pressure and have boiling points at atmospheric pressure above about 150° C.

Other components including inert fillers such as, for example, sand, microballoons, glass fibers, asbestos, aluminum granules, silicon carbide powder and the like, coloring agents, such as pigments and dyes including, for example, chromic oxide, ferric oxide, mixtures thereof and the like may be employed in the compositions of the present invention without detracting from the scope thereof.

Suitable materials from which adequate molds, for casting the compositions of the present invention, may be prepared include polymers such as, for example, polyethylene, polypropylene, their copolymers and the like, polyurethanes, polysiloxane elastomers, Mylar, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e. the reactants may not be readily demolded unless the mold is preheated to about 50°–90° C, especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, game pieces, decorative objects, furniture or furniture components, gears or other machine components, threaded protective plugs and caps, and the like.

In some instances, a mixture of the components (A) and (B) are so incompatible that the reaction occurs very slowly (i.e. solidification requires more than 10 minutes). When this occurs, a modifier-compound having a high dielectric constant measured at 20° C, and a frequency of $1 \times 10^4$ cycles per second of greater than 4 and preferably greater than 8, such as, for example, ethylacetoacetate, propylene carbonate, acetophenone, and dimethyl phthalate can be employed to render the mixture compatible.

These compounds tend to render the components (A) and (B) more compatible, in that they can be blended and will rapidly react to yield a fast setting solid that is demoldable in less than 5 minutes.

The modifier-compatabilizer compounds are employed in the range of from about 2.5 to about 60% by weight of the combined weight of components (A), (B) and (C) and such quantities are included as a portion of the total quantity of component (C) present in the composition.

If the time interval between addition of the polyisocyanate to the amine initiated polyol and the "sudden solidification" of the formulations of the present invention is too short for a given application or situation, the delay time before solidification occurs can be increased by the addition of a low equivalent weight (less than 200 equiv. wt.) liquid, non-amine initiated polyol having a hydroxyl functionality of 2 to 8, preferably having a functionality of 3 to 8.

The weight ratio of non-amine initiated polyol to the amine initiated polyol must be less than 2:1 and generally preferably less than 1:1.

If the delay time between blending of a given polyisocyanate and a given amine initiated polyol and the solidification time is in the order of about 20 seconds, any addition of a nonamine initiated polyol will increase the delay time before solidification and the addition of an equal weight ratio of non-amine initiated polyol can increase the delay before solidification up to about 120 seconds.

The following examples are illustrative of the present invention but are not to be construed as to limiting the scope thereof in any manner.

In each of the examples and comparative experiments, all of the components except the polyisocyanate were thoroughly blended together and then the polyisocyanate was rapidly blended into the mixture and immediately poured into a polyethylene mold or a Mylar tray.

The compositions, setting and demolding times and properties of the products are given in the following table.

Type B was a dimerized diphenylmethane diisocyanate having an average functionality of about 2.25 and an NCO equivalent weight of about 144.

Type C was a polymethylene polyphenylisocyanate having an average functionality of about 2.6 and an NCO equivalent weight of about 134.

Type D was a prepolymer having a % free NCO of about 32 prepared by reacting an 80/20 mixture of 2,4-/2,6-toluene diisocyanate with the reaction product of glycerine with propylene oxide to an OH equivalent weight of about 87.

The modifier compounds employed as component (C) in the preceeding examples and comparative ex-

| Example or Comparative Experiment No. | Component A Type | Component A Grams | Component B Type | Component B Grams | Component C Type | Component C Grams | Time* in Sec. to Solidify | Sec. to Demold | Density Grams/cc | Other Properties or Remarks |
|---|---|---|---|---|---|---|---|---|---|---|
| Ex. 1 | A | 26 | A | 30 | A | 30 | 15 | 30 | 1.16 | Shore D hardness = 92 |
| Comp. Exp. A | A | 26 | A | 30 | none | — | 25 | — | 0.61 | Swelled, cracked, distorted and formed gross fissures or cracks |
| Ex. 2 | B | 35 | A | 30 | B | 30 | 25 | 70 | 1.08 | Off white, opaque product. |
| Comp. Exp. B | B | 30 | A | 30 | none | — | — | — | 0.59 | Swelled and cracked. |
| Ex. 3 | A | 33 | B | 50 | C | 33 | 20 | 40 | >1.0 | Opaque, cream colored, solid. |
| Ex. 4 | A | 52 | A | 60 | C | 60 | 20 | 40 | 1.16 | Shore D hardness = 96, Tensile Strength = 7428 psi at an elongation of 8%. |
| Ex. 5 | A | 52 | C | 92 | D | 60 | 35 | 50 | >1.0 | Tensile strength = 9765 psi at an elongation of 10%. |
| Ex. 6 | A | 26 | A | 30 | E | 60 | 50 | 54 | 1.12 | Shore D hardness = 79 |
| Ex. 7 | A | 26 | A | 30 | E | 30 | 20 | 45 | 1.14 | Shore D hardness = 88 |
| Ex. 8 | A | 26 | A | 30 | F | 30 | 25 | 50 | 1.13 | Shore D hardness = 73 |
| Ex. 9 | C | 18 | D | 45 | C / G | 10 / 10 | 90 | 120 | >1.0 | Opaque, white solid |
| Ex. 10 | C | 18 | C | 46 | G | 10 | 40 | 80 | >1.0 | |
| Ex. 11 | C | 18 | C | 46 | C / G | 10 / 10 | 90 | 180 | >1.0 | |
| Ex. 12 | D | 42 | A | 30 | D | 30 | 40 | 90 | 1.07 | Shore D hardness = 89 |
| Ex. 13 | B | 44 | A | 50 | H | 50 | 35 | 115 | >1 | Shore D Hardness = ~85 |
| Ex. 14 | A | 26 | A | 30 | I | 30 | 20 | 40 | >1 | Shore D Hardness = >80 |
| Ex. 15 | B | 26 | A | 30 | J | 30 | 25 | 50 | 1.04 | Shore D Hardness = >85 |
| Ex. 16 | A | 30 | A | 35 | K | 35 | 20 | 60 | >1 | Shore D Hardness = >80 |
| Ex. 17 | B | 26 | A | 30 | L | 40 | 20 | 50 | >1 | Shore D Hardness = >85 |
| Ex. 18 | B | 40 | A | 46 | M | 30 | 20 | 60 | >1 | Shore D Hardness = >85 |
| Ex. 19 | B | 26 | A | 30 | N | 30 | 20 | 40 | 1.06 | Shore D Hardness = >80 |
| Ex. 20 | A | 26 | C | 45 | O | 30 | 20 | 50 | >1 | Shore D Hardness = >80 |
| Ex. 21 | A | 26 | A | 30 | P | 30 | 20 | 50 | >1 | Shore D Hardness = ~85 |

*The time was measured from the moment the isocyanate was blended into the mixture.

The amine initiated polyols employed as component (A) in the preceeding examples and comparative experiments were as follows:

Type A was aminoethylethanol amine reacted with propylene oxide in a molar ratio of about 1:3 respectively having a hydroxyl equivalent weight of about 72.

Type B was the reaction product of diethylene triamine with propylene oxide in a molar ratio of about 1:5 respectively and having an OH equivalent weight of about 76.

Type C was triethanolamine.

Type D was the reaction product of diethylenetriamine with propylene oxide in a molar ratio of about 1:8 respectively and having an OH equivalent weight of about 115.

The polyisocyanates employed as component (B) in the preceeding examples and comparative experiments were as follows:

Type A was an 80/20 mixture of the 2,4-/ 2,6-isomers of toluenediisocyanate having an NCO equivalent weight of about 87.

periments were as follows:

Type A was trichlorobenzene.

Type B was the reaction product of glycerine with propylene oxide to a molecular weight of about 1500.

Type C was dioctylphthalate.

Type D was a mixed stream of aromatic-containing compounds containing polyethylbenzenes as the residue stream obtained from the manufacture of ethyl benzene and having a typical composition by weight as follows:

3% triethylbenzene
11% tetraethylbenzene
1% pentaethylbenzene
3% bis-ethylphenylethane
8% ethylphenyl-phenylethane
13% 1,1-diphenylethane
61% higher boiling components Type E was diphenylether.

Type F was a liquid chlorinated paraffin having a specific gravity of about 1.15, a viscosity at 25° C of about 25 poises and containing about 40% by weight chlorine commercially available as Chlorowax No. 40 from Diamond Alkali Co.

compositions and results are given in the following table.

| | EXPERIMENT NUMBER | | | | |
|---|---|---|---|---|---|
| | Present Invention | | Comparative Experiment | | |
| | A | B | C | D | E |
| 2,4-toluenediisocyanate, grams | 45 | 45 | 38.9 | 38.9 | 38.9 |
| triethanol amine, gms. | 17 | 17 | 11.1 | 0 | 11.1 |
| hydroxyl initiated polyol[1], grams | 0 | 0 | 0 | 38.9 | 0 |
| trichlorobenzene, gms./%[2] | 38/38 | 62/50 | 50/50 | 38.9/33 | 0 |
| chlorinated biphenyl, 48% chlorine, gms/%[2] | 0 | 0 | 0 | 0 | 50/50 |
| NCO:OH ratio | 1.53:1 | 1.53:1 | 2.05:1 | 1:1 | 2.05:1 |
| Solidification time | 90 sec. | 2 min. | still liquid after 2 hrs. | still liquid after 2 hrs. | still liquid after 12 hrs. |
| demold time | 3 min. | 4½ min. | N.D.[3] | N.D. | N.D. |
| density, g/cc | >1 | >1 | N.D. | N.D. | N.D. |

[1]The hydroxyl initiated polyol was an adduct of glycerine and propylene oxide to a molecular weight of about 260.
[2]% modifier is based upon the combined weight of the modifier, the polyol and the polyisocyanate.
[3]N.D. = not determined.

Type G was ethylacetoacetate.
Type H was a capped polyether polyol which was the reaction product of allyl alcohol with a 50/50 mole % mixture of ethylene oxide and 1,2-propylene oxide to an average molecular weight of about 1800 and subsequently capped with methyl groups.
Type I was the reaction product of a glycerine initiated polyoxypropylene glycol having a molecular weight of about 3000 with three moles of phthalic anhydride and then with ethylene oxide, the resultant ester-modified polyether polyol having an average OH equivalent weight of about 976.
Type J was tricresyl phosphate.
Type K was tri-n-butyl phosphite.
Type L was bis(2-bromopropyl)-2-bromopropane phosphonate.
Type M was the cyclic pentamer of propylene oxide.
Type N was tetrahydronaphthalene.
Type O was propylene carbonate.
Type P was 3-methyl sulfolane.

EXAMPLE 22

Components of the composition:
30 grams amine polyol, Type A
30 grams of the reaction product of glycerine with propylene oxide to an average molecular weight of about 260.
60 grams of dioctyl phthalate
60 grams of polyisocyanate Type A.

After rapidly stirring the polyisocyanate into a mixture of the other components, the liquid mixture was poured into a 450 cc polyethylene beaker. About 90 seconds after stirring in the TDI, the liquid mixture began to turn opaque and in another 30 seconds, this mixture had solidified into an opaque white solid. Four minutes after addition of the TDI, this cast rigid polymer was removed from the polyethylene mold. This tough dense opaque white casting was found to exhibit a Shore D hardness greater than 80 and a density of 1.13 g/cc.

EXAMPLE 23

In each of the following experiments, the components were rapidly blended together and then poured into a Mylar tray or into a polyethylene beaker. The

I claim:
1. A process for producing solid, rigid, polyurethane articles having a density of at least 1 g/cc, a percent elongation of less than 100, and which can be demolded within a period of about 5 minutes without the addition of an external source of heat, which process comprises
   1. admixing, in the absence of a catalytic quantity of a catalyst for urethane formation, the components of a composition comprising
      A. an amine initiated polyol having an OH equivalent weight of from about 50 to less than about 250;
      B. an organic aromatic polyisocyanate;
      C. a liquid modifier having a boiling point above about 150° C selected from nonhydroxyl-containing polyoxyalkylene compounds and mixtures thereof; wherein components (A) and (B) are present in quantities such that the NCO:OH ratio is from about 0.8:1 to about 1.5:1 and component (C) is employed in quantities of from about 5% to about 60% by weight of the combined weights of components (A), (B) and (C);
   2. placing the admixed composition into a suitable mold wherein said composition solidifies within less than about 5 minutes to a solid having a density of at least 1 g/cc and a percent elongation of less than 100; and
   3. subsequently demolding the resultant article from the mold.
2. The process of claim 1 wherein components (A) and (B) are present in quantities such that the NCO-:OH ratio is from about 0.90:1 to about 1.2:1 and component (C) is present in quantities of from about 15% to about 40% by weight of the combined weight of components (A), (B) and (C) and wherein component (A) has an OH equivalent weight of from about 50 to about 200.
3. The process of claim 2 wherein components (A) and (B) are present in quantities such that the NCO-:OH ratio is from about 0.95:1 to about 1.05:1.
4. The process of claim 3 wherein component (C) is an adduct of a 3 to 10 carbon atom alcohol and a vicinal 2 to 4 carbon atom alkylene oxide or mixture of such oxides, said adduct being capped with a 1 to 3 carbon atom hydrocarbon group.

5. The process of claim 1 wherein said alcohol is selected from n-butyl alcohol, allyl alcohol, and n-decyl alcohol.

6. The process of claim 1 wherein component (A) is selected from the group consisting of triethanolamine, an adduct of diethylenetriamine with propylene oxide and an adduct of aminoethylethanolamine with propylene oxide.

7. The process of claim 1 wherein component (B) is selected from the group consisting of 2,4-toluenediisocyanate, 2,6-toluenediisocyanate, diphenylmethanediisocyanate, and mixtures thereof.

8. The process of claim 1 wherein said mold is that of a decorative object.

9. The process of claim 1 wherein said mold is that of a furniture component.

10. The process of claim 1 wherein said mold is that of a machine component.

11. The process of claim 1 wherein Component (A) additionally contains a non-amine initiated polyol having an equivalent weight of less than about 200 and wherein the weight ratio of non-amine initiated polyol to amine initiated polyol is less than about 2:1.

12. The process of claim 11 wherein the ratio of non-amine initiated polyol to amine initiated polyol is less than about 1:1.

* * * * *

UNITED STATES PATENT AND TRADEMARK OFFICE
CERTIFICATE OF CORRECTION

PATENT NO. : 3,989,663
DATED : Nov. 2, 1976
INVENTOR(S) : Franciszek Olstowski

It is certified that error appears in the above-identified patent and that said Letters Patent are hereby corrected as shown below:

Col. 13, line 3, "1" should be --4--.

Signed and Sealed this

First Day of February 1977

[SEAL]

Attest:

RUTH C. MASON
*Attesting Officer*

C. MARSHALL DANN
*Commissioner of Patents and Trademarks*